UNITED STATES PATENT OFFICE.

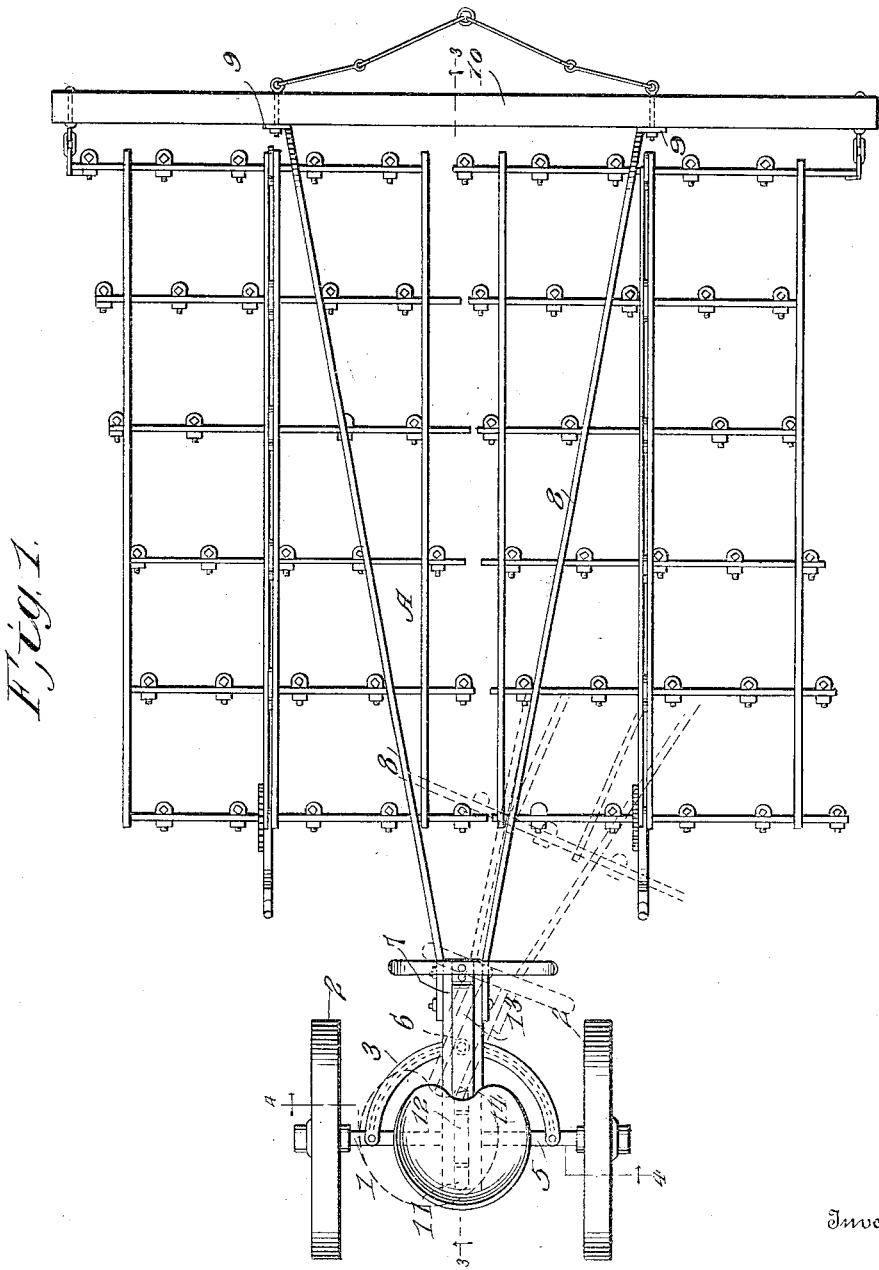

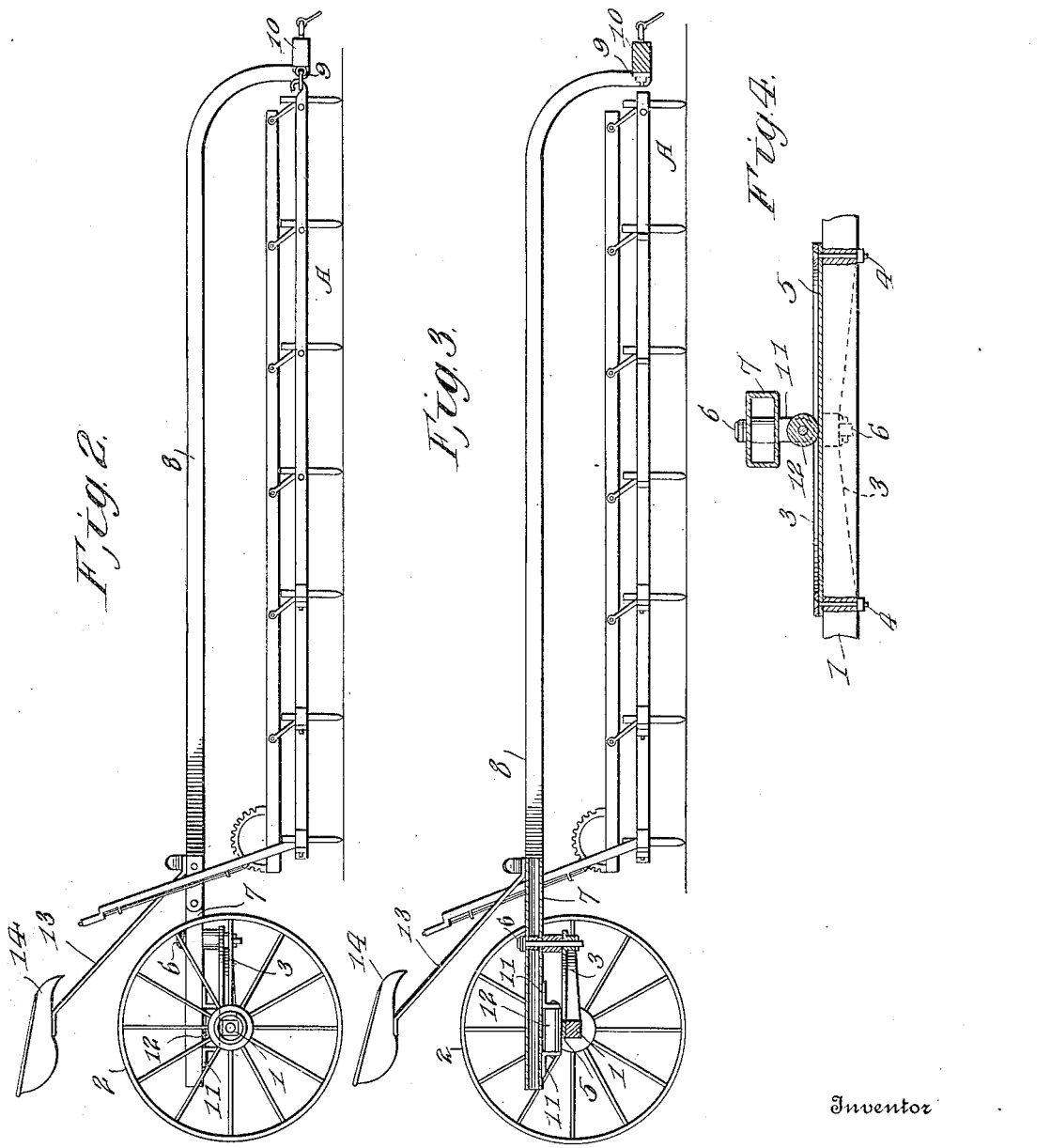

CHARLES O. PLUMMER, OF FAY, OKLAHOMA.

HARROW-CART.

1,131,547.  Specification of Letters Patent.  Patented Mar. 9, 1915.

Application filed December 3, 1912. Serial No. 734,747.

*To all whom it may concern:*

Be it known that I, CHARLES O. PLUMMER, a citizen of the United States, residing at Fay, in the county of Dewey and State of Oklahoma, have invented new and useful Improvements in Harrow-Carts, of which the following is a specification.

This invention relates to harrow carts, and it has for its object to produce a simple and efficient device of this character which may be readily applied to and used in connection with any ordinary drag or harrow.

A further object of the invention is to produce a simple and efficient harrow cart which will enable the driver or operator to be constantly in line with the draft animals, thereby giving the operator better control of the machine.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a top plan view, showing the improved harrow cart applied for operation and with dotted lines indicating the relative position of the parts in the act of turning. Fig. 2 is a side elevation. Fig. 3 is a sectional view taken on the line 3—3 in Fig. 1. Fig. 4 is a sectional detail view taken on the line 4—4 in Fig. 1.

Corresponding parts in the several figures are denoted by like characters of reference.

The axle 1 of the improved harrow cart is provided with transporting wheels 2.

3 designates a brace which may be of approximately semi-circular shape, as shown, said brace being secured on the axle by means of bolts or fastening members 4 which also serve to secure in position a wear plate 5 on top of the axle.

Pivotally mounted on the brace 3 by means of a bolt 6 is a reach bar 7 having forwardly extending divergent arms 8, said arms being downturned at their front ends to form brackets 9 which are suitably connected with the draft bar 10 of an ordinary harrow, which latter is shown at A.

The reach bar 7 is provided near its rear end with downwardly extending lugs 11 supporting a roller 12 which extends transversely across the axle 1 and rides on the wear plate 5. The reach bar also has an upwardly extending resilient arm 13 supporting a seat 14 for the driver or operator.

As will be readily seen from the foregoing description taken in connection with the drawings, I have provided a riding attachment or cart of extremely simple construction which may be readily applied to and used in connection with an ordinary harrow. When it is desired to turn at the end of a field, the reach bar will rock on the bolt 6, and the driver will remain positioned in line with the draft animals while the turn is being made. The roller 12 will ride on the axle without undue friction, and the operation of turning may be easily and quickly performed.

Having thus described the invention, what is claimed as new, is:—

A harrow cart comprising a wheeled axle, a forwardly extending brace, a wear plate on top of the axle, fastening members connecting the forwardly extending brace and the wear plate with the axle, a reach bar pivoted on the forwardly extending brace and having forwardly divergent arms, a roller supported for rotation on the underside of the reach bar for engagement with the wear plate, said roller being of a length materially exceeding the width of the wear plate and the axle, and a seat supported on the reach bar.

In testimony whereof I affix my signature in presence of two witnesses.

CHARLES O. PLUMMER.

Witnesses:
 FLOYD V. JONES,
 FRANK W. SMITH.